United States Patent [19]

Inoue et al.

[11] Patent Number: 5,449,714
[45] Date of Patent: Sep. 12, 1995

[54] PREPARATION OF CONDUCTIVE SILICONE RUBBER COMPOSITION

[75] Inventors: Yoshio Inoue; Susumu Sekiguchi; Masaharu Takahashi, all of Annaka, Japan

[73] Assignee: Shin-Etsu Chemical Co., Ltd., Tokyo, Japan

[21] Appl. No.: 159,164

[22] Filed: Nov. 30, 1993

[30] Foreign Application Priority Data

Nov. 30, 1992 [JP] Japan ................................. 4-343436

[51] Int. Cl.$^6$ ................................................ C08K 3/04
[52] U.S. Cl. ................................. 524/495; 524/588; 524/847; 524/863; 524/864; 252/511
[58] Field of Search ............... 524/495, 588, 847, 863, 524/864; 252/511

[56] References Cited

U.S. PATENT DOCUMENTS 4,387,046 6/1983 Marsch et al. ...................... 524/588
5,082,596 1/1992 Fukuda et al. ...................... 524/588

*Primary Examiner*—Melvyn I. Marquis
*Assistant Examiner*—Karen A. Dean

[57] ABSTRACT

A conductive silicone rubber composition is prepared by mixing an organopolysiloxane having an aminoalkyl radical, an organopolysiloxane having a (meth)acryloxyalkyl or glycidoxyalkyl radical, and conductive carbon black to form silicone rubber composition (A) in which the carbon black is fixed, and then mixing it with a silicone rubber composition (B) comprising a dimethylpolysiloxane. The composition has stable resistivity in the semiconductive region independent of molding conditions.

11 Claims, No Drawings

PREPARATION OF CONDUCTIVE SILICONE RUBBER COMPOSITION

BACKGROUND OF THE INVENTION

1. Field of the Invention

This invention relates to a method for preparing a conductive silicone rubber composition, and more particularly, to a method for preparing a conductive silicone rubber composition which yields silicone rubber having stable conductivity in the semiconductive region and thus finding use as roll members in copying and facsimile machines.

2. Prior Art

Most rubbery materials are electric insulators. A number of conductive rubbers are available as mixtures of rubbery material and conductive agents. For example, rubbers having carbon black blended therein to provide an electric resistivity of from $10^{-1}$ to $10^2$ $\Omega$-cm are conductive rubbers which are used in various applications.

Silicone rubber is also widely used as electrically insulating rubber because of its heat resistance, low-temperature resistance and weatherability. It can also be used as conductive silicone rubber by adding conductive agents as with other rubbery materials.

The conductive agents which are added to silicone rubber for imparting electric conductivity are typically carbon black, graphite, various metal powders such as silver, nickel, and copper, various non-conductive particles and short fibers surface treated with silver or similar metals, carbon fibers, and metallic fibers. By mixing these conductive agents, the resistivity of silicone rubber can be reduced to the order of $10^{10}$ to $10^{-3}$ $\Omega$-cm depending on the type and amount of conductive agent without detracting from the inherent properties of silicone rubber.

Where silicone rubber is blended with conductive carbon black such as Ketjen Black and acetylene black so as to provide a resistivity in the semiconductive region of $10^3$ to $10^{10}$ $\Omega$-cm, the resistivity experiences a large variation and is difficult to stabilize. This is probably because the dispersion of carbon markedly varies depending on molding conditions.

In the manufacture of business machine parts including those used in dry copying machines, for example, rubber rolls such as charging, transfer, developing and pressing rolls and rubber members such as cleaning blades and fixing belts, the industry is now searching for materials having semiconductive characteristics. Therefore, there is a need for rubber articles having minimized variation of electrical resistivity in the semiconductive region, that is, stable electrical resistivity.

SUMMARY OF THE INVENTION

Therefore, an object of the present invention is to provide a method for preparing a conductive silicone rubber composition which yields a rubber article having stable electrical resistivity.

We have found that by previously preparing (A) a silicone rubber composition comprising organopolysiloxanes of the average compositional formulae (1) and (2) and conductive carbon black, and then mixing it with (B) a silicone rubber composition comprising an organopolysiloxane of the average compositional formula (3), there is obtained a conductive silicone rubber composition which can yield silicone rubber having a well stabilized resistivity in the range of $10^3$ to $10^{10}$ $\Omega$-cm.

Average compositional formula (1):

$$R^1_a R^2_b SiO_{(4-a-b)/2}$$

$R^1$ is a substituted or unsubstituted monovalent hydrocarbon radical, up to 95 mol % of $R^1$ being a methyl radical, $R^2$ is a monovalent organic radical containing a primary amine, and letters a and b are positive numbers satisfying $a+b = 1.98$ to $2.02$.

Average compositional formula (2):

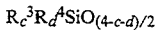

$$R^3_c R^4_d SiO_{(4-c-d)/2}$$

$R^3$ is a substituted or unsubstituted monovalent hydrocarbon radical, $R^4$ is a monovalent organic radical containing an $\alpha,\beta$-unsaturated carbonyl derivative or epoxy radical, and letters c and d are positive numbers satisfying $c+d = 1.98$ to $2.02$.

Average compositional formula (3):

$$R^5_e SiO_{(4-e)/2}$$

$R^5$ is a substituted or unsubstituted monovalent hydrocarbon radical, at least 98 mol % of $R^5$ being a methyl radical, and letter e is a positive number of from 1.98 to 2.02.

Japanese Patent Application Kokai (JP-A) No. 190964/1991 discloses that a mixture of (A) a silicone rubber composition comprising an organopolysiloxane of the average compositional formula $R_n SiO$ wherein R is a substituted or unsubstituted monovalent hydrocarbon radical, up to 95 mol % of R being a methyl radical, and letter n is a positive number of from 1.98 to 2.02 and conductive carbon black with (B) a silicone rubber composition comprising an organopolysiloxane of average compositional formula (3) has a stable electrical resistivity in the semiconductive region. We have found that the procedure of first reacting an organopolysiloxane of average compositional formula (1) with an organopolysiloxane of average compositional formula (2) to form silicone rubber composition (A) having conductive carbon black fixed therein and then mixing it with silicone rubber composition (B) is more effective for minimizing the variation of electrical resistivity in the semiconductive region independent of molding conditions.

More illustratively, conventional silicone rubber having conductive carbon black added thereto has an electrical resistivity which can vary over 4 to 6 orders whereas conductive silicone rubber resulting from the inventive silicone rubber composition has an electrical resistivity which varies only within one order. In addition, the inventive silicone rubber composition is improved in molding and vulcanization. Particularly with respect to moldability, it is significantly improved over the conventional semiconductive silicone rubber compositions.

According to the present invention, there is provided a method for preparing a conductive silicone rubber composition comprising the step of mixing (A) a silicone rubber composition comprising an organopolysiloxane of formula (1), an organopolysiloxane of formula (2), and conductive carbon black with (B) a silicone rubber composition comprising an organopolysiloxane of formula (3).

DETAILED DESCRIPTION OF THE INVENTION

According to the present invention, a conductive silicone rubber composition is prepared by mixing (A) a silicone rubber composition containing conductive carbon black with (B) a silicone rubber composition free of carbon black.

The silicone rubber composition (A) includes an organopolysiloxane of the average compositional formula (1).

$$R_a^1 R_b^2 SiO_{(4-a-b)/2} \qquad (1)$$

In formula (1), is a substituted or unsubstituted monovalent hydrocarbon radical, preferably having 1 to 10 carbon atoms. Examples include alkyl radicals such as methyl, ethyl and propyl, cycloalkyl radicals such as cyclopentyl and cyclohexyl, alkenyl radicals such as vinyl and allyl, cycloalkenyl radicals, aryl radicals such as phenyl and tolyl, and substituted ones thereof wherein some of the hydrogen atoms are replaced by fluorine atoms, chlorine atoms, cyano radicals, and organic radicals, typically halogenated hydrocarbon radicals and cyano-substituted hydrocarbon radicals such as chloromethyl, $\gamma$-trifluoropropyl, and perfluoroalkyl radicals. It is necessary that a methyl radical occupy up to 95 mol %, preferably 50 to 95 mol % of $R^1$.

$R^2$ is a monovalent organic radical containing a primary amine, for example, aminoalkyl radicals having 1 to 10 carbon atoms such as aminomethyl, aminoethyl, aminopropyl, aminomethylaminopropyl and 2- aminoethylpropyl radicals, and aminoaryl radicals having 6 to 20 carbon atoms such as aminophenoxy and p-aminoethylphenoxyethyl radicals.

Letters a and b are positive numbers satisfying a+b=1.98 to 2.02. The organopolysiloxane should contain at least one R in a molecule. Preferably, b (a+b)=0.001 to 0.2.

Preferably the organopolysiloxane has a backbone consisting essentially of a dimethylpolysiloxane unit in which phenyl, vinyl and aminopropyl radicals are incorporated. Preferably, the methyl radical is up to 95 mol % of $R^1$, more preferably 70 to 90 mol % of $R^1$, the phenyl radical is 5 to 20 mol % of $R^1$, the vinyl radical is 0.001 to 10 mol % of $R^1$, and the aminopropyl radical is 0.1 to 20 mol % based on the total of $R^1$ and $R^2$.

The organopolysiloxane (1) preferably has a viscosity of 1,000 to 10,000,000 centistokes (cs), especially 10,000 to 1,000,000 cs at 25° C.

The silicone rubber composition (A) also includes an organopolysiloxane of the average compositional formula (2) as a crosslinking agent.

$$R_c^3 R_d^4 SiO_{(4-c-d)/2} \qquad (2)$$

In formula (2), $R^3$ is a substituted or unsubstituted monovalent hydrocarbon radical, which is as defined for $R^1$ in formula (1).

$R^4$ is a monovalent organic radical containing an $\alpha,\beta$-unsaturated carbonyl derivative or epoxy radical. Examples of the $\alpha,\beta$-unsaturated carbonyl derivative include methacryloxyalkyl radicals such as methacryloxymethyl and methacryloxyethyl radicals, and acryloxyalkyl radicals such as acryloxymethyl and acryloxyethyl radicals. Examples of the epoxy radical include glycidoxyalkyl radicals such as glycidoxymethyl, glycidoxyethyl and glycidoxypropyl radicals and 2-(3,4-epoxycyclohexyl)ethyl radicals.

Letters c and d are positive numbers satisfying c+d=1.98 to 2.02. The organopolysiloxane should contain at least one $R^4$ in a molecule while the content of $R^4$, that is, the value of d is not critical.

The organopolysiloxane (2) preferably has a viscosity of 10 to 100,000 cs, especially 100 to 10,000 cs at 25° C.

The amount of organopolysiloxane of average compositional formula (2) blended is not particularly limited although it is preferred that the monovalent organic radical containing an $\alpha,\beta$-unsaturated carbonyl derivative or epoxy radical be present in from 0.5 to 2 mol, more preferably an equimolar amount to one mol of the amino radical in average compositional formula (1).

The silicone rubber composition (A) further includes electroconductive carbon black which may be selected from various types of conductive carbon black commonly used in conductive rubber compositions. Examples include acetylene black, conducting furnace black (CF), super conducting furnace black (SCF), extra conducting furnace black (XCF), conducting channel black (CC), and furnace black and channel black heat treated at elevated temperatures of about 1,500° C. More particularly, the acetylene black includes Denka Acetylene Black manufactured by Denki Kagaku K.K. and Shawinigan Acetylene Black manufactured by Shawinigan Chemical Co., the conducting furnace black includes Continex CF manufactured by Continental Carbon Co. and Vulcan C manufactured by Cabot Corp., the super conducting furnace black includes Continex SCF manufactured by Continental Carbon Co. and Vulcan SC manufactured by Cabot Corp., the extra conducting furnace black includes Asahi HS-500 manufactured by Asahi Carbon K.K. and Vulcan CX-72 manufactured by Cabot Corp., and the conducting channel black includes Corax L manufactured by Degussa Co. Also useful are modified furnace blacks commercially available as Ketjen Black EC and Ketjen Black EC-600JD from Ketjen Black International.

The conductive carbon black may be used alone or in admixture of two or more species, preferably in an amount of from 1 to 50 parts, more preferably from 10 to 40 parts by weight per 100 parts by weight of the organopoly -siloxane of formula (1). Less than 1 parts of carbon black would sometimes fail to provide desired electric conduction whereas more than 50 parts of carbon black would sometimes give a harder rubber composition which is inconvenient to mold and results in cured products having low mechanical strength.

On the other hand, the silicone rubber composition (B) includes an organopolysiloxane of the average compositional formula (3), but is free of conductive carbon black and insulating.

$$R_e^5 SiO_{(4-e)/2} \qquad (3)$$

In formula (3), $R^5$ is a substituted or unsubstituted monovalent hydrocarbon radical, which is as defined for $R^1$ in formula (1). It is necessary that at least 98 mol % of $R^5$ be a methyl radical. More preferably $R^5$ contains 0.001 to 2 mol % of a vinyl radical in addition to a methyl radical. Letter e is a positive number of from 1.98 to 2.02.

The organopolysiloxane (3) preferably has a viscosity of 1,000 to 10,000,000, especially 100,000 to 10,000,000.

The silicone rubber composition (A) is obtained by mixing the organopolysiloxanes of formulae (1) and (2)

with conductive carbon black. Any mixing methods capable of achieving uniform mixing may be used, for example, kneading methods using conventional rubber blending mixers such as Banbury mixers, pressure kneaders, two-and three-roll mills. Optionally, the composition is allowed to stand overnight at room temperature or heat treated, the addition reaction to proceed to a full extent.

If desired, silicone rubber composition (A) may contain additives such as wet silica, dry silica, ground quartz, silicone fluid, and carbon functional silane.

The silicone rubber composition (B) may consist of the organopolysiloxane of formula (3). If desired, like composition (A), composition (B) may contain additives commonly used in silicone rubber compositions, for example, such as wet silica, dry silica, ground quartz, low viscosity silicone fluid terminated with a hydroxyl group, and carbon functional silane, but carbon black should be omitted from composition (B). Silicone rubber composition (B) may be prepared by mixing these components by any of mixing methods as described for composition (A).

It is to be noted that silicone rubber composition (B) is commercially available, for example, in the trade names of KE 931U, KE 951U, KE 520U and KE 555U from Shin-Etsu Chemical Co., Ltd.

The silicone rubber compositions (A) and (B) may be mixed in a weight ratio of from 5:95 to 95:5, especially from 20:80 to 80:20 because a desired electrical resistivity is obtained within this range.

The conductive silicone rubber composition of the present invention can be vulcanized and cured by conventional methods. The curing agent used herein is not limited in curing mechanism as long as it accomplishes vulcanization and curing through radical reaction, addition reaction, condensation reaction or the like commonly used for the vulcanization of conventional conductive silicone rubber compositions. That is, any of conventional well-known curing agents may be used. The curing agent can be blended in an amount so that the composition is cured.

More illustratively, the radical reaction crosslinking agents include organic peroxides, for example, alkyl peroxides such as di-t-butyl peroxide and 2,5-dimethyl-2,5-di(butylperoxy)hexane and acyl peroxides such as dicumyl peroxides. The addition reaction curing agents include organohydrogenpolysiloxanes having at least two hydrogen atoms attached to silicon atoms in a molecule and platinum series catalysts. The condensation curing agents include polyfunctional alkoxysilanes or siloxanes and organic metal salts. It will be understood that the amount of curing agent added is as used. in conventional conductive silicone rubber compositions.

Preferably the curing agent is added and mixed after the silicone rubber compositions (A) and (B) are mixed. Mixing can be done by any conventional mixing methods, for example, kneading methods using conventional rubber blending mixers such as Banbury mixers, pressure kneaders, two-and three-roll mills. If desired for facilitating mastication, there may be added various additives such as ground quartz, wet silica, dry silica, processing oil commonly used in Synthetic rubber, carbon functional silane, and modified silicone fluid.

The thus prepared conductive silicone rubber composition of the present invention may be molded by any desired technique such as compression molding, extrusion molding, injection molding, and calendering techniques.

There has been described a conductive silicone rubber composition which has stable electric resistivity with minimal variation in the semiconductive regions with little dependence on the molding conditions. The composition is readily moldable and vulcanizable and cures into rubber products having good rubber resilience. The conductive silicone rubber obtained by curing the conductive silicone rubber composition of the invention is advantageously used in a variety of applications including the manufacture of business machine parts, for example, rubber roll members such as charging rolls, transfer rolls, developing rolls, paper feed rolls, and fixing rolls, pressing rolls, electricity removal rolls, cleaning rolls and oil coating rolls, and rubber members such as cleaning belts and fixing belts all used in dry copying machines as well as in the electric industry and transportation as automotive parts.

EXAMPLE

Examples of the present invention are given below by way of illustration and not by way of limitation. All parts are by weight.

Examples 1–3

A silicone rubber composition (A1) was prepared by kneading 100 parts of methylphenylvinyl($\gamma$-aminopropyl)siloxane polymer consisting of 86.85 mol % of $(CH_3)_2SiO$ unit, 0.15 mol % of $(CH_2=CH)(CH_3)SiO$ unit, 10 mol % of $(C_6H_5)_2SiO$ unit, and 3 mol % of $H_2NC_3H_6(CH_3)SiO$ unit and having an average degree of polymerization of 1,000 and 30 parts of Acetylene Black (Denki Kagaku K.K.) in a pressure kneader, adding thereto 2 parts of methylacryloxypropylsiloxane polymer consisting of $(H_2C=CHCOOC_3H_6)(CH_3)SiO$ unit having a viscosity of 150 cs in a two-roll mill and allowing the mixture to stand overnight.

A silicone rubber composition (B1) was prepared by kneading 100 parts of dimethylvinylpolysiloxane raw rubber consisting of 99.85 mol % of $(CH_3)_2SiO$ unit and 0.15 mol % of $(CH_2=CH)(CH_3)SiO$ unit and having an average degree of polymerization of 8,000, 15 parts of silica powder (specific surface area 200 m$^2$/g, available in the trade name of Aerosil 200 from Nippon Aerosil K.K.) and 5 parts of hydroxy-end-blocked dimethylsiloxane oil having an average degree of polymerization of 20 in a kneader.

Using a two-roll mill, compositions (A1) and (B1) were blended in the ratio shown in Table 1 to compositions. Conductive silicone rubber compositions were prepared by adding 2 parts of a paste containing 25% of 2,5-dimethyl-2,5-bis(t-butylperoxy)hexane to 100 parts of each compound. They were then formed into sheets of 6 mm thick by heating and pressing at 175° C. and 100 kgf/cm$^2$ for 10 minutes.

Examples 4–6

A silicone rubber composition (A2) was prepared by kneading 100 parts of methylphenylvinyl($\gamma$-aminopropyl)siloxane polymer consisting of 79.85 mol % of $(CH_3)_2SiO$ unit, 0.15 mol % of $(CH_2=CH)(CH_3)SiO$ unit, 10 mol % of $(C_6H_5)_2SiO$ unit, and 10 mol % of $H_2NC_3H_6(CH_3)SiO$ unit and having an average degree of polymerization of 900 and 30 parts of Acetylene Black (Denki Kagaku K.K.) in a pressure kneader, adding thereto 2 parts of methylmethacryloxypropylsiloxane polymer consisting of $(H_2C=CHCOOC_3H_6)(CH_3)SiO$ unit having a viscosity of 100 cs in a two-roll mill and heat treating the mixture at 150° C. for 2 hours.

Another silicone rubber composition was the same as composition (B1) used in Example 1.

Using a two-roll mill, compositions (A2) and (B1) were blended in the ratio shown in Table 2 to form compounds. Conductive silicone rubber compositions were prepared by adding 2 parts of a paste containing 25% of 2,5-dimethyl-2,5-bis(t-butylperoxy)hexane to 100 parts of each compound. They were then formed into sheets of 6 mm thick by heating and pressing at 175° C. and 100 kgf/cm$^2$ for 10 minutes.

Comparative Examples 1–3

A silicone rubber composition (A3) was prepared by kneading 100 parts of methylphenylvinylsiloxane raw rubber consisting of 89.85 mol % of $(CH_3)_2SiO$ unit, 0.15 mol % of $(CH_2=CH)(CH_3)SiO$ unit, and 10 mol % of $(C_6H_5)_2SiO$ unit and having an average degree of polymerization of 8,000 and 30 parts of Acetylene Black (Denki Kagaku K.K.) in a pressure kneader.

Another silicone rubber composition was the same as composition (B1) used in Example 1.

Using a two-roll mill, compositions (A3) and (B1) were blended in the ratio shown in Table 3 to form compounds.

Conductive silicone rubber compositions were prepared by adding 2 parts of a paste containing 25% of 2,5-dimethyl-2,5-bis(t-butylperoxy)hexane to 1001 parts of each compound. They were then formed into sheets of 6 mm thick by heating and pressing at 175° C. and 100 kgf/cm$^2$ for 10 minutes.

Comparative Examples 4–6

A silicone rubber composition was prepared by mixing 100 parts by weight of the silicone rubber composition (B1) described above with 15 parts by weight of Acetylene Black (Denki Kagaku K.K.) as Comparative Example 4.

Another silicone rubber composition was prepared by mixing 50 parts by weight of methylphenylvinylsiloxane raw rubber consisting of 89.85 mol % of $(CH_3)_2SiO$ unit, 0.15 mol % of $(CH_2=CH)(CH_3)SiO$ unit, and 10 mol % of $(C_6H_5)_2SiO$ unit and having an average degree of polymerization of 8,000 (i.e. the silicone rubber composition (A3) containing no Acetylene Black), 50 parts by weight of the silicone rubber composition (B1), and 15 parts by weight of Acetylene Black (Denki Kagaku K.K.) as Comparative Example 5.

A further silicone rubber composition was prepared by mixing 50 parts by weight of methylphenylvinyl(γ-aminopropyl)siloxane polymer consisting of 86.85 mol % of $(CH_3)_2SiO$ unit, 0.15 mol % of $(CH_2=CH)(CH_3)SiO$ unit, and 10 mol % of $(C_6H_5)_2SiO$ unit, and 3 mol % of $H_2NC_3H_6(CH_3)SiO$ unit and having an average degree of polymerization of 1,000 and 2 parts of methylacryloxypropylsiloxane polymer consisting of $(H_2C=CHCOOC_3H_6)(CH_3)SiO$ unit having a viscosity of 150 cs (i.e. the silicone rubber composition (A1) containing no Acetylene Black), 50 parts by weight of the silicone rubber composition (B1), and 15 parts by weight of Acetylene Black (Denki Kagaku K.K.) as Comparative Example 6. Conductive silicone rubber compositions were prepared by adding 2 parts of a paste containing 25% of 2,5-dimethyl-2,5-bis(t-butylperoxy)hexane to 100 parts of each compound. They were then formed into sheet of 6 mm thick by heating and pressing at 175° C. and 100 kgf/cm$^2$ for 10 minutes.

The sheets obtained in Examples 1–6 and Comparative Examples 1–6 were measured for hardness on JIS A scale and volume resistivity (Ω-cm). The results are shown in Tables 1 to 4.

TABLE 1

|  | Example |  |  |
|---|---|---|---|
|  | 1 | 2 | 3 |
| Composition A1 | 30 | 50 | 70 |
| Composition B1 | 70 | 50 | 30 |
| Hardness (JIS A scale) | 49 | 47 | 51 |
| Volume resistivity (Ω-cm) | $9 \times 10^8 - 2 \times 10^9$ | $5 \times 10^8 - 9 \times 10^8$ | $1 \times 10^7 - 6 \times 10^7$ |

TABLE 2

|  | Example |  |  |
|---|---|---|---|
|  | 4 | 5 | 6 |
| Composition A2 | 30 | 50 | 70 |
| Composition B1 | 70 | 50 | 30 |
| Hardness (JIS A scale) | 51 | 50 | 49 |
| Volume resistivity (Ω-cm) | $1 \times 10^8 - 9 \times 10^8$ | $5 \times 10^8 - 9 \times 10^8$ | $1 \times 10^7 - 7 \times 10^7$ |

TABLE 3

|  | Comparative Example |  |  |
|---|---|---|---|
|  | 1 | 2 | 3 |
| Composition A3 | 30 | 50 | 70 |
| Composition B1 | 70 | 50 | 30 |
| Hardness (JIS A scale) | 49 | 48 | 47 |
| Volume resistivity (Ω-cm) | $5 \times 10^7 - 9 \times 10^8$ | $1 \times 10^8 - 2 \times 10^9$ | $3 \times 10^7 - 6 \times 10^8$ |

TABLE 4

|  | Comparative Example |  |  |
|---|---|---|---|
|  | 4 | 5 | 6 |
| Composition A1 containing no Acetylene Black | — | — | 50 |
| Composition A3 containing no Acetylene Black | — | 50 | — |
| Composition B1 | 100 | 50 | 50 |
| Acetylene Black | 15 | 15 | 15 |
| Hardness (JIS A scale) | 49 | 47 | 48 |
| Volume resistivity (Ω-cm) | $2 \times 10^4 - 1 \times 10^{10}$ | $1 \times 10^6 - 5 \times 10^9$ | $3 \times 10^6 - 2 \times 10^9$ |

Note that the volume resistivity was measured at ten points on the 6-mm sheet using MODEL HT-210 (manufactured by Mitsubishi Uka K.K.). The maximum and minimum values are reported.

As seen from Tables 1 to 4, the vulcanized silicone rubber samples obtained by the inventive method show more stable electrical resistance values in the semiconductive region with a variation within about one order, as compared with the conventional samples in which conductive carbon is simply added to silicone rubber.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for preparing a conductive silicone rubber composition comprising:

mixing (A) a silicone rubber composition comprising an organopolysiloxane of the average compositional formula (1), an organopolysiloxane of the average compositional formula (2), and conductive carbon black with (B) a silicone rubber composition comprising an organopolysiloxane of the average compositional formula (3) and free of conductive carbon black, wherein the average compositional formulae are $$R_a^1 R_b^2 SiO_{(4-a-b)/2} \tag{1}$$

wherein $R^1$ is a substituted or unsubstituted monovalent hydrocarbon radical, up to 95 mol % of the $R^1$ groups being methyl radicals, $R^2$ is a monovalent organic radical containing a primary amine, and letters a and b are positive numbers satisfying $a+b=1.98$ to 2.02, $$R_c^3 R_d^4 SiO_{(4-c-d)/2} \tag{2}$$

wherein $R^3$ is a substituted or unsubstituted monovalent hydrocarbon radical, $R^4$ is a monovalent organic radical containing an α,β-unsaturated carbonyl derivative or epoxy radical, and letters c and d are positive numbers satisfying $c+d=1.98$ to 2.02, and $$R_e^5 SiO_{(4-e)/2} \tag{3}$$

wherein $R^5$ is a substituted or unsubstituted monovalent hydrocarbon radical, at least 98 mol % of the $R^5$ groups being methyl radials, and letter e is a positive number of from 1.98 to 2.02.

2. The method of claim 1, wherein the monovalent organic radical containing a primary amine is an aminoalkyl radical or aminoaryl radical.

3. The method of claim 1, wherein $R^1$ of the organopolysiloxane of formula (1) consists essentially of up to 95 mol % methyl radicals, 5 to 20 mol % phenyl radicals, 0.001 to 10 mol % vinyl radicals, and 0.1 to 20 mol % aminopropyl radicals.

4. The method of claim 1, wherein the conductive carbon black is used in an amount of 1 to 50 parts by weight per 100 parts by weight of the organopolysiloxane of formula (1).

5. The method of claim 1, wherein the monovalent organic radical containing an α,β-unsaturated carbonyl derivative or epoxy radical is present in an amount of 0.5 to 2 mol per one mol of the amino radical in the organopolysiloxane of average compositional formula (1).

6. The method of claim 1, wherein $R^5$ of formula (3) consists essentially of at least 98 mol % methyl radicals and 0.001 to 2 mol % vinyl radicals.

7. The method of claim 1, wherein the silicone rubber compositions (A) and (B) are mixed in a weight ratio of from 5:95 to 95:5.

8. The method of claim 5, wherein the monovalent organic radical containing an α,β-unsaturated carbonyl derivative or epoxy radical is present in an equimolar amount to the amino radical in organopolysiloxane of the average compositional formula (1).

9. The method of claim 1, wherein the conductive silicone rubber composition provides, upon curing, a cured product having an electrical resistivity in the range of $10^3$ to $10^{10}$ Ω-cm, which is stabilized such that it varies only within one order of magnitude in the cured composition.

10. A method for preparing a conductive silicone rubber composition comprising:

mixing an organopolysiloxane of the average compositional formula (1):

$$R_a^1 R_b^2 SiO_{(4-a-b)/2} \tag{1}$$

wherein $R^1$ is a substituted or unsubstituted monovalent hydrocarbon radical, up to 95 mol % of the $R^1$ groups being methyl radicals, $R^2$ is a monovalent organic radical containing a primary amine, and letters a and b are positive numbers satisfying $a+b=1.98$ to 2.02, an organopolysiloxane of the average compositional formula (2):

$$R_c^3 R_d^4 SiO_{(4-c-d)/2} \tag{2}$$

wherein $R^3$ is a substituted or unsubstituted monovalent hydrocarbon radical, $R^4$ is a monovalent organic radical containing an α,β-unsaturated carbonyl derivative or epoxy radical, and letters c and d are positive numbers satisfying $c+d=1.98$ to 2.02, and conductive carbon black to prepare a silicone rubber composition (A), mixing said silicone rubber composition (A) with a conductive carbon black-free silicone rubber composition (B) comprising an organopolysiloxane of the average compositional formula (3):

$$R_e^5 SiO_{(4-e)/2} \tag{3}$$

wherein $R^5$ is a substituted or unsubstituted monovalent hydrocarbon radical, at least 98 mol % of the $R^5$ groups being methyl radicals, and letter e is positive number of from 1.98 to 2.02, and adding thereto an organic peroxide as a radical reaction crosslinking agent.

11. The method of claim 10, wherein the conductive silicone rubber composition provides, upon curing, a cured product having an electrical resistivity in the range of $10^3$ to $10^{10}$ Ω-cm, which is stabilized such that it varies only within one order of magnitude in the cured composition.

* * * * *